Dec. 29, 1964 D. C. ENGELBART 3,163,854

MAGNETIC FLUX TRANSFER IN CORE SYSTEMS

Filed Oct. 30, 1959 3 Sheets-Sheet 1

DOUGLAS C. ENGELBART
INVENTOR.

BY Lyon & Lyon
ATTORNEYS.

MAGNETIC FLUX TRANSFER IN CORE SYSTEMS

Filed Oct. 30, 1959 3 Sheets-Sheet 2

DOUGLAS C. ENGELBART
INVENTOR.

BY Lyon & Lyon

ATTORNEYS.

DOUGLAS C. ENGELBART
INVENTOR.
BY Lyon & Lyon
ATTORNEYS.

United States Patent Office 3,163,854

Patented Dec. 29, 1964

3,163,854

MAGNETIC FLUX TRANSFER IN CORE SYSTEMS

Douglas C. Engelbart, Palo Alto, Calif., assignor to AMP Incorporated, Harrisburg, Pa., a corporation of New Jersey Filed Oct. 30, 1959, Ser. No. 849,776
8 Claims. (Cl. 340—174)

This invention relates to mangetic-core systems of the type wherein data is transferred by transferring the state of magnetic remanence from one core to another. More particularly, this invention relates to improvements in such systems whereby operating tolerances are broadened.

In an article entitled "A High-Speed Logic System Using Magnetic Elements and Connecting Wire Only," by H. D. Crane, in The Proceedings of the I.R.E., Volume 47, pp. 63–73, January 1959, there is described a shift register which employs magnetic cores for the bistable-state storage elements in the register. These cores are of a type commonly known as multi-aperture cores, in that they are substantially toroidal in shape and have a large, central main aperture with at least two smaller apertures in the arms of the toroid. One of these smaller apertures is known as the receive aperture and the other is known as the transmit aperture. This shift register exemplifies a type of device in which this invention is applicable. The shift register operates by virtue of initially receiving data in binary form, which is represented by certain ones of the cores in the register by the state of the magnetic remanence of these cores. For readout or delay purposes, the data in the shift register is shifted through the register, in the course of which a core will transfer its state of magnetic remanence to a succeeding core, in order that succeeding core represent the bit of data stored in the transferring core.

The mechanics of the transfer from one core to another in a shift register, whereby the remanence flux states are transferred, are clearly explained in the previously mentioned article. Briefly, however, the transmit aperture of one core is coupled to the receive aperture of a succeeding core through a closed-loop winding for the purpose of securing the transfer of flux from the one core to the succeeding core. A transfer current is applied to the closed-loop winding for the purpose of securing the transfer of flux from the one core to the succeeding core. This current has a value such that if the one core is in its zero state of magnetic remanence, the current flowing in the transfer winding does not affect the state of remanence of the succeeding core. However, if the one core is in a one-state of magnetic remanence, then the application of transfer current causes flux to switch about the transmit aperture, inducing a voltage in the transfer winding whereby a large part of the transfer current is steered through the receive aperture of the succeeding core, thereby driving it to its one-state of magnetic remanence.

It will be appreciated from the above brief description of the transfer mechanism that a characteristic is required whereby for certain values of transfer current below a threshold value the succeeding core be unaffected and for values of transfer current above a threshold value, the succeeding core be driven to its one-state of magnetic remanence. This requires a flux transfer characteristic which is somewhat difficult to achieve in practice, since it depends upon the interaction of a number of factors, such as the transfer-current amplitude, duration, the resistance of the transfer loop as well as its inductance, and also the peculiar dynamic switching characteristics of the magnetic material from which the multi-aperture cores are made. One is not always free to manipulate these factors to a point where an optimum transfer characteristic between cores is obtained.

An object of this invention is to provide an arrangement for optimizing the transfer characteristic between magnetic cores employed in apparatus of the type described.

Another object of the present invention is to provide an arrangement in apparatus of the type described whereby there is considerable design latitude, while maintaining an optimum transfer characteristic between cores employed in the apparatus.

Yet another object of the present invention is the provision of a novel and improved arrangement for transferring flux and thereby the state of magnetic remanence from one magnetic core to a succeeding magnetic core.

These and other objects of the invention are achieved in a system of the type wherein it is desired to transfer the state of magnetic remanence of a first magnetic core to a second magnetic core by applying current to a transfer winding coupling said first and second cores. Additional magnetic material is provided which is inductively coupled to said transfer winding. Said additional magnetic material has the property that it is drivable to a state of magnetic remanence before said second core can be driven to its state of magnetic remanence by the transfer current in said transfer winding. The additional magnetic material effectively operates to remove flux sought to be transferred from the first to the second cores. Thereby, an optimum transfer characteristic is effectuated between the cores.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 3:
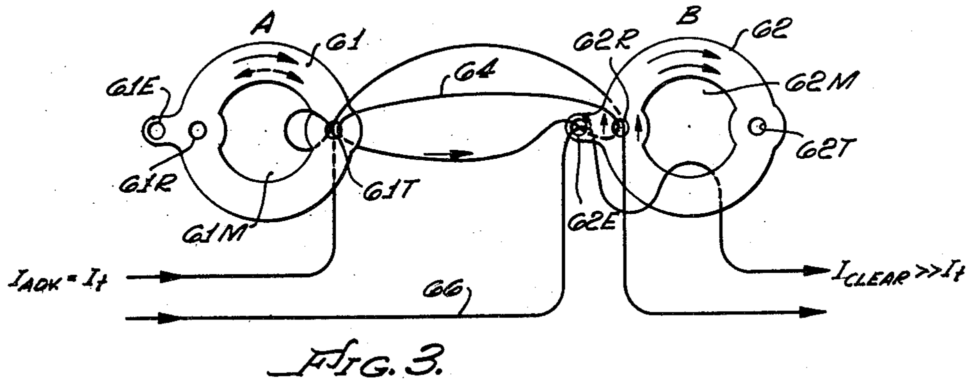
Figure 4:
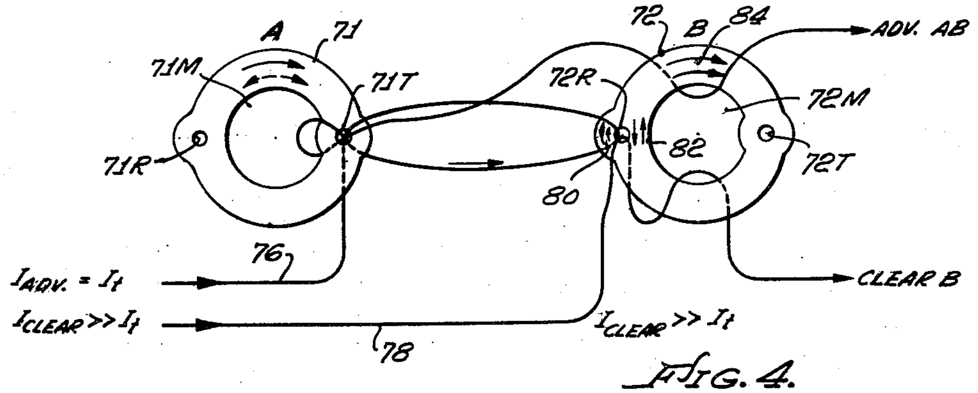
Figure 5:
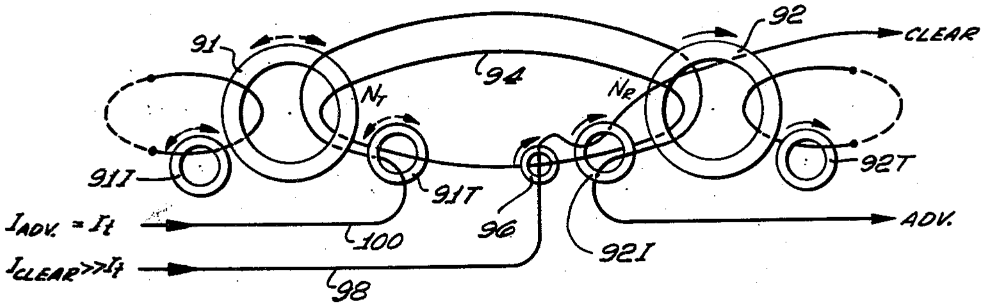

FIGURES 3, 4, and 5 show other embodiments of the invention; and

Figure 6:
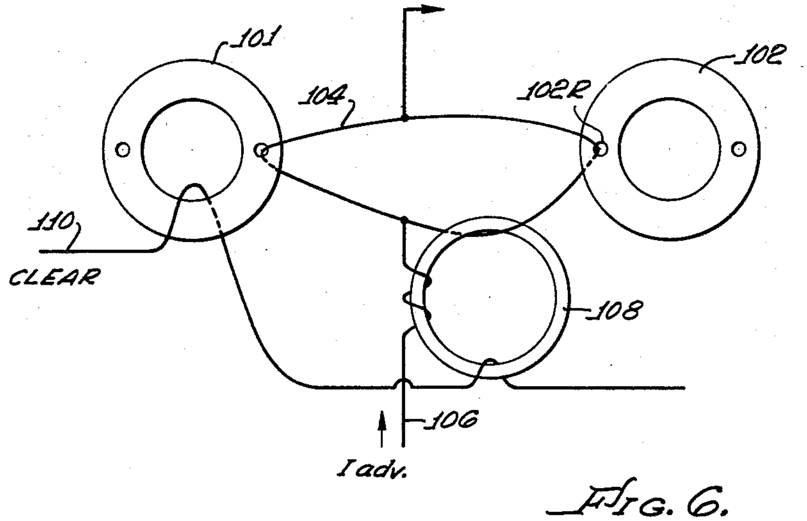
Figure 7:
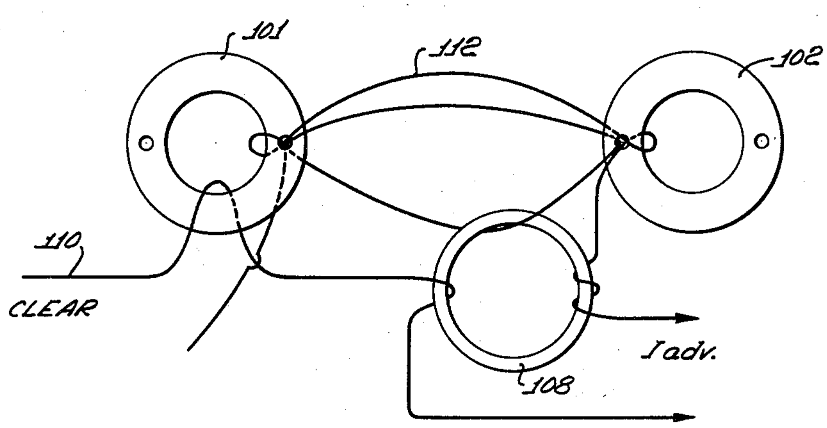

FIGURES 6 and 7 show still other embodiments of this invention.

Figure 1:
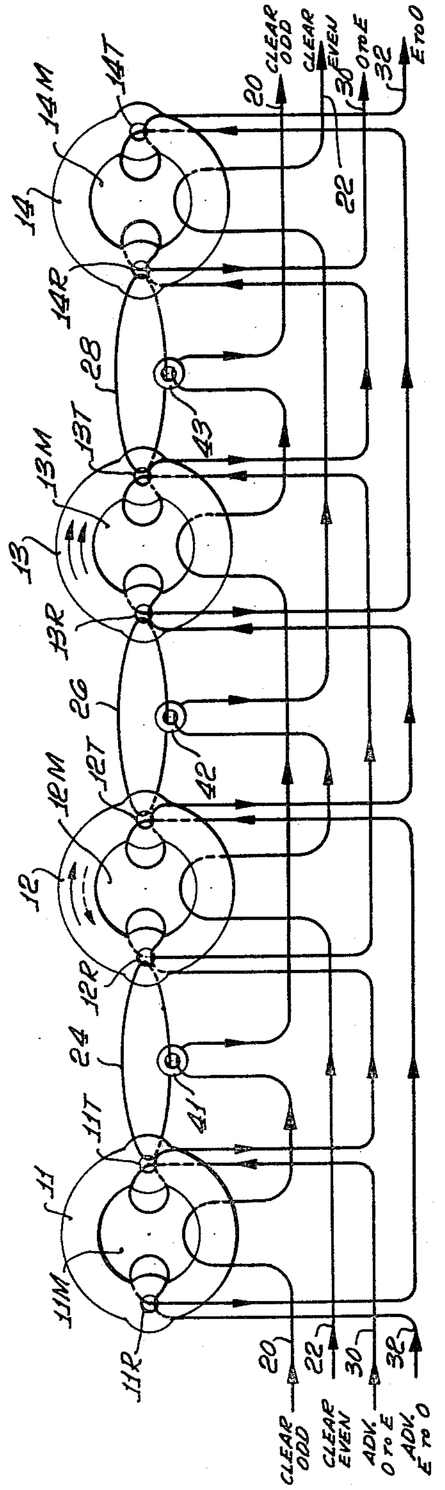
FIGURE 1 shows an embodiment of the invention applied to a shift register employing a multiaperture magnetic core.

By way of illustration of a type of apparatus which can employ the embodiment of the invention, there is shown in FIGURE 1 two stages of a shift register employing multi-aperture cores. This should not be construed as a limitation upon the invention, since it will become apparent that the inventive concepts are applicable to arrangements wherein it is desired to transfer flux from one core to a succeeding core. The extension of the principles to be described, to a shift register having any number of stages, will become apparent as this explanation progresses. In the magnetic core shift register shown, there are two cores required for storing each binary bit of data. The cores are numbered in sequence, respectively 11, 12, 13, and 14. One stage of the register will include cores 11 and 12, and the second stage of the register will include cores 13 and 14. Each one of the cores will have a main aperture, respectively 11M, 12M, 13M, and 14M, a receive aperture, respectively 11R, 12R, 13R, and 14R, and a transmit aperture, respectively 11T, 12T, 13T, and 14T.

To restore all the cores bearing odd numbers in the sequence of cores to their clear state, there is provided a clear-odd winding 20, which is inductively coupled to all the aforesaid cores through their main apertures. Current applied to the clear-odd winding serves the function of restoring all odd-numbered cores to their cleared, or zero, state. A clear-even winding 22 is provided, which serves the same function for all the even-numbered cores in the sequence of cores in the shift register. The clear-even winding 22 is coupled to all these even-numbered cores by their main apertures.

The transmit aperture of each core is coupled to the receive aperture of a succeeding core by means of a transfer winding. The transfer windings for the arrangement shown in FIGURE 1 respectively are numbered 24, 26, 28. Transfer winding 24 couples cores 11 and 12; transfer winding 26 couples cores 12 and 13; and transfer winding 28 couples cores 13 and 14. In order to cause an advance of data from the cores bearing odd numbers to the cores bearing even numbers, current is applied to the drive windings that are associated with the transfer windings which couple the odd-numbered to the even-numbered cores. The means of applying this current may be either direct, that is, by actually connecting a conductor from a current source by means of a drive winding to the transfer winding between each of the odd and even cores, or in a preferred manner by inducing the required transfer current in the transfer loop. The arrangement shown in FIGURE 1 is the one for applying transfer current by inducing it.

An advance-odd-to-even winding 30 is threaded through the transmit aperture 11T and then through the main aperture, and back through the transmit aperture once again. It then is passed through the receive aperture 12R of the succeeding core, then through the main aperture back through the receiving aperture 12R, and thereafter to the transmit aperture of the next odd core in the sequence. The advance-odd-to-even winding thus couples to the transmit and receive apertures of the respective odd and even cores of all the cores employed in the shift register. When a current is applied to the advance-odd-to-even winding 30, it flows through the winding and, in view of the transformer coupling with the transfer winding, induces a transfer current in the respective transfer windings 24, 26, 28, whereby a transfer of flux between the odd and even cores may be effectuated.

An advance-even-to-odd winding 32 is also provided, and this couples to the transmit aperture 12T of the even core 12 and the receive aperture 13R of the odd core 13 in the same manner as has been described for the coupling of the advance-odd-to-even winding 30 to the apertures 11T, 12R of the respective odd and even cores 11 and 12. The advance-even-to-odd winding in this manner is coupled to all the transmit and receive apertures of the respective even and odd cores in the shift register. Upon the application of a current to the advance-even-to-odd winding, it induces currents in the transfer loops coupling the even and odd cores, whereby a transfer of flux between the cores may be effectuated.

When advance current flows through the advance windings of a core from which information is to be transferred, flux will be switched about the transmit aperture only if the core were in the one state. Otherwise, if the core were in the zero state, no flux would be switched in the transmitting core, and no currents would be induced thereby in the transfer winding loop. The receiving core, with no current in the transfer windings, will not switch either, and thus stays in the clear or zero state.

If the transmitting core had been in the one state, the advance current would cause switching about its transmit aperture, and the transfer-winding current thereby induced, when flowing through the receive aperture of the receiving core, adds to the M.M.F. of the advance-winding current there to cause switching of flux about the main aperture of the receiving core. It may thus be stated that a transfer of flux has occurred or that a transfer of a state of remanence has been effectuated.

In accordance with this invention, extra magnetic material in the form of small cores 41, 42, 43 are coupled in the coupling loops between two successive cores 11, 12, 13, 14. These small cores 41, 42, 43 are initially saturated in the clear state of magnetic remanence. With the floating-loop type of coupling to the transfer coil as shown, there will be current in the transfer winding only during the time that flux linkages are being transmitted from the transmit to the driven core. Assuming that each extra core 41, 42, 43 has a very low switching threshold and is initially saturated in the clear state, and is coupled to the transfer winding in a manner so that any current in the transfer winding which tends to drive the driven core toward the set state, will also drive this additional core toward its set state. The additional core thus will absorb most of the initial drive or flux linkages which are sought to be transferred. This requires a relatively low transfer-winding loop current, assumedly low enough so that very little or no flux linkages are absorbed by the succeeding core until after the extra core is saturated. If flux linkages are still being injected into the transfer-winding loop after the extra core becomes saturated, then the loop current will increase to a limit (ideally) of twice the current being applied to the advance winding. This increase causes the succeeding core to switch ever more rapidly after it begins to switch, and thereby the loop current will find an equilibrium value at which the driving and driven core are delivering and receiving, respectively, flux linkages at the same rate. It must be assumed that the ratio of the number of turns through the transmit aperture of a core to the number of turns through the receive aperture of the succeeding core is large enough so that the loss of flux from the transmitted flux linkage leaves enough to set a significant amount into the driven core.

It should be noted that the clear-odd winding 20 is also inductively coupled to the magnetic cores 41 and 43 so that when the odd-numbered cores in the sequence are cleared these extra cores are also driven to their cleared state. Similarly, the clear-even winding 22 is also coupled to the aperture of extra core 42 so that when the even-numbered cores in the register are driven to their clear state the even-numbered extra cores are also driven to their clear state. The operation of a shift register of the type shown in FIGURE 1 requires that after each energization of an advance winding, a clear winding is energized which clears the cores from which data has just been transferred. Thereby, the extra cores are cleared as well.

For the purpose of making an ideal analysis of the benefits obtained in accordance with this invention and for simplifying a consideration thereof, the effects of the transfer-winding resistance and inductance upon a transfer operation should be neglected as well as the fact that a driven core is being switched slowly during the time before the extra core saturates. Assume, further, that all the volt seconds of flux linkage (in the absence of the extra core) issuing from the driving core will be absorbed in the driven core.

In a completely lossless transfer situation without an extra core, there will be switched into a driven core an amount of flux ($\phi_R = \phi$ received), which differs from that switched at the transmitting aperture of the driving core ($\phi_T = \phi$ transmitted) by a factor of $$\frac{N_T}{N_R}$$

i.e., $$\phi_R = \left(\frac{N_T}{N_R}\right)\phi_T$$

This implies a constant value of "flux gain," which could not satisfy the requirements of the digital technique here being developed. If two different values of flux (i.e., flux switched away from the reference saturation direction) are desired to be transmitted stably from one multi-aperture core to a second multi-aperture core, then there must exist a peculiar $\phi_R$ vs. $\phi_T$ curve, for which there are exactly two points where unity gain exists and where $$\frac{d\phi_R}{d\phi_T}$$

is less than unity; i.e., the ratio of the change in received flux divided by the change in the transmitted flux is less than unity.

Figure 2:
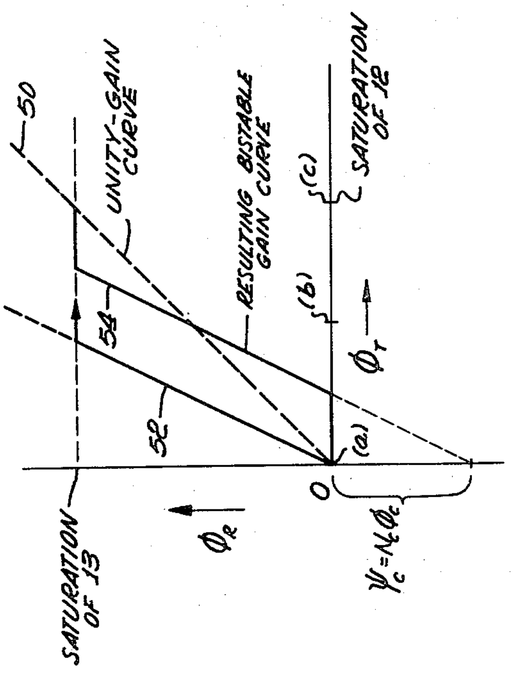
FIGURE 2 is a series of curves shown to afford a better understanding of the invention.

FIGURE 2 is a graph of the relationship between $\phi_R$ and $\phi_T$ for the various cases to be discussed. The dotted line 50 illustrates a unity-gain curve. The line 52 illustrates a lossless case, where the ratio $$\frac{N_t}{N_r}$$

is greater than unity. Since it is not possible to transmit less than zero flux or to receive more than saturation flux, it is known that the flux-gain characteristic must lie within the ordinate range of from zero to saturation of a driven core. As a result, where a transmit-receive system has the characteristics designated by the curve 52, there would be only one stable point on the curve which would occur when a driven core is at saturation. This can be considered so since the core would not long stay in a zero state in view of the existence of small perturbations which always occur in a practical system. The zero flux state is one of unstable equilibrium.

If a fixed loss is introduced into an otherwise lossless transmission system, a curve 54, such as is shown in FIGURE 2, is obtained. Since less than zero flux can never be transmitted or more than saturation flux can never be received, the curve has the somewhat S shape shown. This is obtained by subtracting from the receive flux, represented by the lossless case curve 52, an amount of flux linkage $$\frac{\Psi_c}{N_R}$$

where $\Psi_c=N_c\phi_c$, which is that amount absorbed from the system by the extra core. Assuming a zero flux state initially corresponding to the zero point on the curve, any positive perturbations can only succeed in moving the state of the core into a less-than-unity-gain range of the curve, which results in the flux level being forced back toward zero during successive transfer operations. The zero point on the curve is now one of stable equilibrium. Any initial state between the points zero, designated as *a* and point *b* on the abscissa, will result in the less-than-unity-gain characteristic existing in this range, forcing the level down toward the stable zero flux state during successive transfer operations. Point *b* is the value of the ordinate at the crossover of the curves 50 and 54 between zero flux and saturation.

Any initial state between the points *b* and *c* will find the more-than-unity-gain characteristic whereby the flux level is forced up during successive transfer operations toward the upper equilibrium level, corresponding to point *c*. Any negative perturbations of the system superimposed upon the level at point *c* would not alter the equilibrium level condition of the system.

An initial state corresponding to point *b* would not find equilibrium. A positive perturbation would put the system into the greater-than-unity-gain range, driving the receiving core toward point *c*. A negative perturbation would put the system into a less-than-unity-gain range, whereby the receiving core would go back toward point *a*. Thus, point *b* is one of unstable equilibrium.

From actual operating experience with the multiaperture core transfer systems, it has been found that in order to operate they must have the type of curve or characteristic designated by reference numeral 54 in FIGURE 2. As was described previously, in the case of a transfer operation where the transmitting core is in the zero flux state, there is current induced in the transfer winding which circulates therein. With a characteristic of the type represented by 52 in FIGURE 2, the receiving core would be driven partially toward its one state, regardless of whether or not the transmitting core was in a one state. However, with the characteristic represented by 54 in FIGURE 2, a "critical value" of the drive must be exceeded before the receiving core can be driven toward its one state. This critical value, in terms of flux, is $N_c\phi_c/N_t$. In a practical situation where it is desired to use the multiaperture cores for transferring the state of remanence therebetween by flux transfer, the actual shape of the curve for the system depends upon the interaction of a number of factors, such as advance-current amplitude and duration, transfer winding resistance and inductance, and the peculiar dynamic switching characteristics of the magnetic materials from which the cores are made. Freedom to manipulate these factors to the point where an optimum-shape flux-transfer curve may be obtained is not always present. In accordance with this invention, the introduction of the extra magnetic material as embodied in FIGURE 1 in the form of an extra core gives considerably more freedom in the design of the other factors involved, so that the increased operational tolerances associated with a more optimum curve, exemplified in FIGURE 2, can be realized.

FIGURE 3 illustrates another arrangement in accordance with this invention whereby the extra core effectively is molded into the multiaperture core element. Only two cores, corresponding to an odd and even core of a system, are shown to simplify the drawing and explanation of the invention without, however, any reduction in the clarity of the explanation. Both cores have main apertures 61M, 62M, a receive aperture 61R, 62R, a transmit aperture 61T, 62T, and an extra aperture 61E, 62E. The extra aperture and its surrounding material serves exactly as does the auxiliary, or extra, core in the arrangement shown in FIGURE 1.

The transfer winding 64 is inductively coupled to the transmit aperture of the core 61 and to the receive aperture 62R of core 62, as well as to the extra aperture 62E of that core. The clear winding 66 is inductively coupled to the core 62 through both its main aperture and the extra aperture. This assures that the extra aperture is always cleared to a state whereby when current flows through the transfer winding, it will be driven toward saturation prior to the drive towards saturation of the remainder of the core 62. In this manner, the extra magnetic material subtracts or clips magnetic flux from the flux being applied to the core 62, and the curve characteristic of the type represented in FIGURE 2 by the curve 54 is obtained. No interaction between the flux around the extra aperture with that in the rest of the multiaperture device is intended nor desired. The amount of additional magnetic material required for the extra aperture walls is determined by the amount of flux it is desired to subtract from that available for driving the core 62 to saturation. The magnetic material surrounding the receive aperture of the core has a cross-sectional area on either side of the aperture at least equal to half the cross-sectional area of the toroidal arm of the core without an aperture therein, while the cross-sectional area of the magnetic material around the extra aperture generally will be smaller than the cross-sectional area of the material adjacent the receive aperture, but of a relative area which is suitable for clipping the desired amount of flux linkages transmitted via the transfer loop to the composite clipper-receiving core.

FIGURE 4 exemplifies another core structure whereby the S-shaped flux transfer curve may be obtained. In this embodiment of the invention, the necessity for an extra aperture in the core is eliminated. The two cores 71, 72 as before have a main aperture 71M, 72M, a transmit aperture 71T, 72T, and a receive aperture 71R, 72R. The transfer winding 74 is inductively coupled to both transmit and receive apertures 71T, 72R. An advance winding 76 is inductively coupled to the transmit and main apertures 71T, 71M in the manner previously described in FIGURE 1. The clear winding 78 is inductively coupled to the receive aperture 72R and the main aperture 72M of the core 72.

Assume that the cross-sectional areas of the two legs 80, 82 associated with the receive aperture 72R are each larger than half the area of the leg 84 of the toroid, which exemplifies the portion wherein there is no aperture, for example, one-third larger. Thus, if the area of the leg 84 is A, then legs 80, 82 may be each $$\frac{A}{2}(1+K)$$

where $K$=one-third=the clipping fraction. The amount of the excess corresponds to that required for a saturation flux reversal of, for example, an extra core of the type shown in FIGURE 1. Let the cleared state of the core 84 be as shown, where the arrows indicate the direction of the flux in the cleared state. The outer leg 80 of the input aperture is saturated and the inner leg 82 of the input aperture has two $\phi_c$ less flux than the outer leg contributing to the total clockwise flux.

If any transfer current flows in the transfer winding in response to flux linkages being switched into the transfer winding from the core 71, it will be found that an amount of flux equal to $\phi_c$ can be switched about the input aperture, at relatively low values of current before any flux need be switched about the main aperture of the core 72. Since it is only the flux that is switched about the main aperture of core 72 that will be available to its output aperture 72T for future transmission to other multiaperture devices, the action of this local switching about the input aperture is essentially equivalent to the clipping or robbing action of the extra core shown in FIGURE 1. In other words, the received flux can essentially be interpreted in this case as only that component of the flux which is switched in the outer leg of the input aperture, which switches about the main aperture. Because of the disparity between the switching threshold about the two apertures in question, it can be seen that, as flux linkages are being delivered into the input of the core 72, essentially no flux will switch about the main aperture until after $N_R\phi_c$ flux linkages are delivered. This, then, gives the desired action.

In an application by this inventor for Magnetic Logic Device, Serial No. 791,995, filed February 9, 1959, and now Patent No. 3,083,355, there is shown an arrangement whereby multiaperture core operations may be simulated, employing cores having a single aperture. FIGURE 5 shows an embodiment of this invention applied to an arrangement of the type shown, described, and claimed in that application. The extra core may be coupled to the transfer winding, where it will provide a transfer characteristic curve of the type shown in FIGURE 2. It operates in exactly the same manner as has been described for FIGURE 1. By clipping or providing a flux loss, the S-shaped flux transfer characteristic curve for the system is enhanced. The arrangement is shown in FIGURE 5. It includes two main toroidal cores 91, 92, an input auxiliary core 91I, 92I, an output auxiliary core 91T, 92T. The transfer winding 94 is inductively coupled to the main apertures of the cores 91 and 92, as well as to the main apertures of the cores 91T, 92I. Also coupled to the transfer winding in the manner shown in FIGURE 1 is an extra core 96. The clear winding 98 will not only clear the odd cores (or the even cores, as the case may be) but also will clear the extra core 96 and the input cores 92I associated with the main core 92. When the advancing winding 100 is energized, it induces a current in the transfer winding which, assuming the transmitting core 91 was saturated in the zero flux direction, is too small to have an effect on the state of remanence of the core 92. However, if the core 91 was saturated in the set or one state, then its flux would begin to switch and thereby deliver flux linkages into the transfer winding. The flux linkages thereby delivered would at first be absorbed by the extra core 96, and then, when this core is saturated counterclockwise, the remaining flux linkages would be delivered to core 92.

FIGURES 6 and 7 show still another embodiment of the invention. This is shown in FIGURE 6 for a directly driven transfer-winding arrangement and in FIGURE 7 for a transformer-driven transfer-winding arrangement. In FIGURE 6 there may be seen an odd multiaperture core 101 and an even multiaperture core 102, which represent two of many identical core pairs which may be employed in a shift register. This shift register is of the type represented in FIGURE 1 and requires the same clear and advance windings as are shown in FIGURE 1. However, the transfer windings, represented by transfer winding 104 in FIGURE 6, are directly driven. This is accomplished by connecting the advancing winding 106 to the center of one side of the transfer winding 104 and from the center of the opposite side of the transfer winding to the center of one side of the next transfer winding to which the advancing drive is to be applied. A direct-drive transfer-winding arrangement is shown and explained in the previously mentioned article by Crane.

In accordance with this invention, an extra core 108 has the advance winding coupled thereto. The extra core is driven to saturation by the same current that is applied to the advancing winding to effectuate an advance. The transfer winding 104 is also coupled to the core 108, but with a sense such that the flux linkages coupled to the transfer winding by the drive applied to core 108 opposes those flux linkages sought to be transferred via the transfer winding. In other words, the polarity of the voltage induced in the transfer winding from the extra core opposes the flow of current in the transfer winding through the receive aperture 102R of the core 102. The clear winding 110, which clears core 101, also clears core 108.

In FIGURE 7 similar reference numerals are employed for similar functioning apparatus. FIGURE 7 shows how the extra core is coupled to the advance winding 112, which is coupled to the cores 101 and 102 in the same manner as shown in FIGURE 1. After the advance winding 112 has been coupled to the even or second core 102, it is coupled to the extra core 108 in a manner to drive it to saturation. When an advance current flows therethrough, the voltage induced in the transfer winding from the extra core being driven opposes and reduces the current flow for a time in the transfer winding. Since the effects of driving core 108 are over before the effects of driving the transmit aperture 101T can terminate, the extra core 108 effectively serves to clip flux linkages at first in the manner described previously where the extra core is driven from the current in the transfer winding instead of positively by the advance current.

The clipper core 108 can be as large in diameter as is desired, since the transfer-winding current does not affect its switching. Its cross-section of area is adjusted relative to the number of transfer-loop turns on the extra core to obtain the desired amount of flux-linkage clipping. It is also possible to use a single extra core which is driven in the manner shown in FIGURES 6 and 7 to clip flux or inject negative flux linkages from more than one transfer winding, assuming that all of these transfer loops are being energized at the same time. This is what happens when a shift is made from all odd to all even cores or all even to all odd cores. Thus, one extra core is coupled to all the transfer windings coupling even-transmit apertures to odd-receive apertures and one extra core is coupled to all the transfer windings coupling odd-transmit apertures to even-receive apertures.

There has accordingly been described and shown herein a novel and useful arrangement whereby, employing the extra magnetic material, either in the form of a separate toroidal core coupled to a transfer winding, or as a part of the core into which it is sought to transfer the state of remanence of a preceding core, a characteristic for the transfer operation can be enhanced which is desirable from the standpoint of stability and required manufacturing tolerances.

I claim:

1. In a system of the type wherein it is desired to transfer the state of magnetic remanence of a first core to a second core by applying current to a transfer winding coupling said first and second cores, the improvement comprising magnetic means coupled to said transfer winding for retarding the drive of said second core by current flowing in said transfer winding until said magnetic means has first been driven from one state of magnetic remanence to another state of magnetic remanence.

2. In a system of the type wherein it is desired to transfer the state of magnetic remanence of a first magnetic core to a second magnetic core by applying current to a transfer winding coupling said first and second cores the improvement comprising additional magnetic material inductively coupled to said transfer winding, said additional magnetic material having two states of magnetic remanence and having the property of being drivable from one to the other state of magnetic remanence before said second core can be driven to its state of magnetic remanence by the current in said transfer winding.

3. In a system as recited in claim 2 wherein said additional magnetic material comprises a toroidal magnetic core inductively coupled to said transfer winding.

4. In a system as recited in claim 2 wherein said second core has an input aperture through which said transfer winding is threaded and said additional magnetic material is included in said second core adjacent to the magnetic material surrounding the input aperture in said second core, and another aperture in said additional magnetic material through which said transfer winding is threaded.

5. In a system as recited in claim 2 wherein said second core has an input aperture through which said transfer winding is threaded and said additional magnetic material is included in said second core adjacent to the magnetic material surrounding the input aperture increasing the area cross-sectional thereof by at least one-third.

6. A magnetic remanence transfer system including a first and second magnetic core each having two states of magnetic remanence and being drivable from one to the other thereof, means for driving said second magnetic core to the state of magnetic remanence of said first magnetic core including a transfer winding inductively coupled to said two cores, means for applying transfer current directly to said transfer winding, and additional magnetic material having two states of magnetic remanence and being inductively coupled to said transfer winding to be driven from one to the other state of remanence when said second core is driven to a state of remanence by current through said transfer winding, said additional magnetic material having the property of being drivable to its state of magnetic remanence before said second magnetic core is driven to its state of magnetic remanence in response to transfer current in said transfer winding.

7. A magnetic remanence transfer system including a first and second magnetic core each having two states of magnetic remanence and being drivable from one to the other thereof, each core being toroidal in shape and having a main aperture, a transmit aperture, and a receive aperture, a third toroidal core having a main aperture, a closed-loop transfer winding threaded through said first core transmit aperture, said second core receive aperture and said third core main aperture, and means for applying transfer current to said closed-loop transfer winding for driving said second core to the same state of remanence as said first core, the sense of the transmit winding threaded through said third core being such as to drive it to a state of remanence when said second core is driven to said state of remanence, said third core material being such as to enable its being driven to its state of remanence in response to the transfer current before said second core is driven.

8. A magnetic remanence transfer system including a first and a second magnetic core each having two states of magnetic remanence and being drivable from one to the other thereof, each core being substantially toroidal in shape and having a main aperture, a transmit aperture, a receive aperture, and an extra aperture spaced from said receive aperture by magnetic material of said core which has a cross section which is larger than the cross section of said magnetic material between said receive aperture and said main aperture, a closed loop transfer winding threaded through said transmit aperture, said extra aperture and said receive aperture, and means for applying transfer current to said closed-loop transfer winding, said closed-loop transfer winding being threaded through said extra and receive apertures with a sense whereby in response to said transfer current the magnetic material about said extra aperture is driven to remanence before the magnetic material about said receive aperture is driven.

References Cited in the file of this patent

UNITED STATES PATENTS

| | | |
|---|---|---|
| 2,683,819 | Rey | July 13, 1954 |
| 2,781,503 | Saunders | Feb. 12, 1957 |
| 2,784,390 | Kun Li Chien | Mar. 5, 1957 |
| 2,805,408 | Hamilton | Sept. 3, 1957 |
| 2,935,739 | Crane | May 3, 1960 |
| 3,032,748 | Meyer et al. | May 1, 1962 |
| 3,053,993 | Barber | Sept. 11, 1962 |
| 3,077,585 | Butler | Feb. 12, 1963 |